(12) United States Patent
Väänänen et al.

(10) Patent No.: US 9,025,450 B2
(45) Date of Patent: *May 5, 2015

(54) METHOD AND EQUIPMENT FOR PERFORMING FLOW SHAPING THAT MAINTAINS SERVICE QUALITY IN PACKET-SWITCHED TELECOMMUNICATIONS

(75) Inventors: Janne Väänänen, Espoo (FI); Mikko Laulainen, Helsinki (FI)

(73) Assignee: Coriant Oy, Espoo (FI)

( * ) Notice: Subject to any disclaimer, the term of this patent is extended or adjusted under 35 U.S.C. 154(b) by 265 days.

This patent is subject to a terminal disclaimer.

(21) Appl. No.: 13/486,976

(22) Filed: Jun. 1, 2012

(65) Prior Publication Data

US 2012/0300625 A1 Nov. 29, 2012

Related U.S. Application Data

(63) Continuation of application No. 10/574,006, filed as application No. PCT/FI2004/000613 on Oct. 14, 2004, now Pat. No. 8,194,542.

(30) Foreign Application Priority Data

Oct. 17, 2003 (FI) ...................................... 20031524

(51) Int. Cl.
*H04L 12/26* (2006.01)
*H04L 12/851* (2013.01)
(Continued)

(52) U.S. Cl.
CPC ............ *H04L 47/2441* (2013.01); *H04L 47/10* (2013.01); *H04L 47/22* (2013.01); *H04L 47/245* (2013.01)

(58) Field of Classification Search
CPC ..... H04L 47/10; H04L 47/22; H04L 47/2441; H04L 47/245
USPC .............. 370/230.1, 231, 232, 233, 234, 235, 370/389, 392
See application file for complete search history.

(56) References Cited

U.S. PATENT DOCUMENTS 6,023,456 A 2/2000 Chapman et al.
6,449,255 B1 9/2002 Waclawsky
(Continued)

FOREIGN PATENT DOCUMENTS

EP 1 124 356 A2 8/2001
EP 1 199 851 A1 4/2002
(Continued)

OTHER PUBLICATIONS

Goyal, P., et al., "Start-time Fair Queuing: A Scheduling Algorithm for Integrated Services Packet Switching Networks," pp. 1-12, Proceedings of SIGCOMM 1996.
(Continued)

*Primary Examiner* — Paul H Masur
(74) *Attorney, Agent, or Firm* — Hamilton, Brook, Smith & Reynolds, P.C.

(57) ABSTRACT

The invention relates to a method and equipment for performing flow shaping that maintains service quality in packet-switched telecommunications. Using the method according to the invention, the speed properties (CIR, PIR, CBS) of an aggregate flow (A) can be monitored and limited in a situation, in which the aggregate flow contains delay-critical traffic (V1), the forwarding of packets representing which cannot be delayed. The invention is based on the fact that, when forwarding packets representing the aggregate flow, a variable is updated, the value of which expresses the earliest permitted moment, at which a packet, representing traffic (V2) other than the delay-critical traffic, can be forwarded. In that case, the transfer speed of the traffic (V2) other than delay-critical traffic adapts to the variations in the transfer speed of the delay-critical traffic, allowing the speed properties of the aggregate flow to be monitored and limited.

20 Claims, 5 Drawing Sheets

(51) Int. Cl.
*H04L 12/801* (2013.01)
*H04L 12/815* (2013.01)

(56) References Cited

U.S. PATENT DOCUMENTS

| | | |
|---|---|---|
| 6,532,213 B1 | 3/2003 | Chiussi et al. |
| 6,549,514 B1 | 4/2003 | Kilkki et al. |
| 6,606,301 B1 | 8/2003 | Muller et al. |
| 6,965,566 B2 | 11/2005 | Kawasaki et al. |
| 7,061,861 B1 | 6/2006 | Mekkittikul et al. |
| 2001/0029457 A1 | 10/2001 | Shaffer et al. |
| 2002/0107908 A1* | 8/2002 | Dharanikota ............... 709/203 |
| 2002/0167957 A1 | 11/2002 | Brandt et al. |
| 2003/0099200 A1 | 5/2003 | Kiremidjian et al. |
| 2003/0165116 A1 | 9/2003 | Fallon et al. |
| 2003/0165148 A1 | 9/2003 | Bishard |
| 2003/0174650 A1* | 9/2003 | Shankar et al. ............... 370/235 |
| 2003/0223369 A1 | 12/2003 | Anderson |
| 2004/0066743 A1 | 4/2004 | Shimojo et al. |
| 2004/0100967 A1 | 5/2004 | Robotham et al. |
| 2004/0105393 A1 | 6/2004 | Ronneke et al. |

FOREIGN PATENT DOCUMENTS

| | | |
|---|---|---|
| EP | 1 227 624 A2 | 7/2002 |
| EP | 1 345 365 A2 | 9/2003 |
| EP | 1 372 306 A3 | 12/2003 |
| WO | WO 02/063837 A1 | 8/2002 |

OTHER PUBLICATIONS

Blake, et al., "An Architecture for Differentiated Services," RFC 2475, Dec. 1998, pp. 1-36.

Stattenberger, G., et al., "Performance evaluation of a Linux DiffServ implementation," Computer Communications 25 (2002), pp. 1195-1213, Elsevier.

International Preliminary Report on Patentability, PCT/FI2004/000613, date of mailing Feb. 1, 2005, 7 pages.

International Search Report, PCT/FI2004/000613, date of mailing Feb. 1, 2005, 3 pages.

\* cited by examiner

METHOD AND EQUIPMENT FOR PERFORMING FLOW SHAPING THAT MAINTAINS SERVICE QUALITY IN PACKET-SWITCHED TELECOMMUNICATIONS

RELATED APPLICATION(S)

This application is a continuation of U.S. application Ser. No. 10/574,006, now U.S. Pat. No. 8,194,542, entitled "Method and Equipment for Performing Flow Shaping that Maintains Service Quality in Packet-Switched Telecommunications", by inventors Janne Väänänen and Mikko Laulainen, which is the U.S. National Stage of International Application No. PCT/FI2004/000613, filed Oct. 14, 2004, published in English, which claims priority under 35 U.S.C. §119 or 365 to Finland, Application No. 20031524, filed Oct. 17, 2003, now Patent No. 20031524.

The entire teachings of the above applications are incorporated herein by reference.

BACKGROUND OF THE INVENTION

In this publication, the following abbreviations are used.
CBS Committed Burst Size (greatest permitted burst size [bit]), when exceeding the committed information flow,
CIR Committed Information Rate (greatest permitted mean traffic speed [bit/s]),
CoS Class of Service
FIFO First In, First Out discipline,
MP Measuring Point, in which the speed characteristics of the traffic flow are measured (e.g., mean traffic speed, momentary traffic speed, bust size),
PIR Peak Information Rate (greatest permitted momentary traffic speed [bit/s]),
PKS Packet size in bits,
V1, V2, . . . Traffic flow 1, 2, . . . ,
VTS The earliest moment in time, after which the next packet representing a specific traffic flow may be forwarded, in order that not even one rule set for a speed property of the traffic flow in question will be broken (Valid Time to Send),
VTS_CIR The earliest moment in time, after which the next packet may be forwarded, in order that the greatest permitted mean speed and/or the greatest permitted burst size will not be exceeded,
VTS_PIR The earliest moment in time, after which the next packet may be forwarded, in order that the greatest permitted momentary speed will not be exceeded.

In packet-switched telecommunications systems, it is often advantageous if the packets being transmitted are classified in different service classes (CoS) according, on the one hand, to the requirements of the applications using the telecommunications service and, on the other, to the kind of service-quality agreements that the telecommunications service provider (Service Provider) has made with its customers. For example, in a telephone application (Voice over Internet), it is essential for the data-transfer delay and the variation of the delay to remain below the permitted limit values. The permitted limit values are often defined in a service-quality agreement. However, when downloading www pages, for example, the data-transfer delay and its variation are significantly less critical quantities.

It is often wished to monitor and limit the speed properties of a traffic flow formed from packets to be transferred. Such a situation occurs, for example, if it is wished to reserve a specific portion of the data-transmission capacity of a transfer link for a specific customer, so that the traffic of the customer in question will not be permitted to exceed the transmission capacity reserved for him. The traffic flow being examined thus consists of packets representing the traffic of the customer in question, which can represent differ service classes. In other words, a virtual transfer link is formed to the customer in question, the transmission capacity of which is part of the capacity of the physical transfer link used for the implementation. A speed property can refer to, for example, the mean speed of the traffic (CIR), the burst size (CBS), by which the mean speed can be momentarily exceeded, or the momentary speed (PIR). Taken more generally, the traffic flow can consist of, for example, packets to be routed to a specific transfer link, packets with a specific source address and sent by a specific end user, or packets that belong to a specific class of service (CoS) and are to be routed to a specific transfer link. In the rest of this publication, a system, which can be used to monitor and limit the speed properties of a traffic flow, will be referred to as a 'shaper' and the operation, in which the speed properties of a traffic flow are monitored and limited, will be referred to as 'shaping'.

The following examines a system, to which two traffic flows V1 and V2 arrive. The traffic flow V1 arriving in the system represents delay-critical traffic (e.g., Voice over Internet), for which a greatest permitted delay and delay variation have been defined. The traffic flow V2 arriving in the system represents traffic that is considerably less delay-critical than that of flow V1. The traffic flows V1 and V2 are multiplexed to a common transfer link S leaving the system. Multiplexing is performed on the basis of priority, in such a way that the packets representing the traffic flow V1 are forwarded with a higher priority than the packets representing the traffic flow V2, because traffic flow V1 represents delay-critical traffic. It is wished to monitor and limit the speed properties of the aggregate flow A being transmitted to the transfer link S.

SUMMARY OF THE INVENTION

FIG. 1 shows one way, according to the prior art, of monitoring and limiting the speed properties of the aggregate flow A. In the following examination that elucidates the matter, the term speed properties is used to include mean speed (CIR [bit/s]), burst size (CBS [bit]), by which the mean speed can be exceeded temporarily, and momentary speed (PIR [bit/s]). When packets are begun to be transferred past the measurement point (MP) marked in FIG. 1 (i.e. when the first bit of the packet being transferred passes the point MP), the values of the variables VTS_CIR and VTS_PIR are calculated for the next packet. VTS_CIR gives the earliest permitted moment in time, when the next packet can be begun to be transferred past MP, in order not to exceed the CIR or the CBS restrictions. Correspondingly, VTS_PIR gives the earliest permitted moment in time, when the next packet can be begun to be transferred past MP, in order not to exceed the PIR restriction. The equations 1 and 2 show the principle generally used for calculating the VST_CIR and the VTS_PIR values.

$$VTS\_CIR_{next} = \max(t - CBS/CIR, VTS\_CIR_{ed}) + PKS_{ed}/CIR, \quad (1)$$

and $$VTS\_PIR_{next} = \max(t, VTS\_PIR_{ed}) + PKS_{ed}/PIR, \quad (2)$$

in which t is the time, PKS is the size of the packet in bits, the sub-index 'next' refers to the next packet and the sub-index 'ed' refers to the packet, the first bit of which is transferred past point MP at the moment t.

When all the speed properties are taken into account, the earliest permitted moment (VTS), when the next packet can begin to be transferred past point MP, is obtained from equation 3.

$$VTS=\max(VTS\_CIR, VTS\_PIR). \quad (3)$$

The multiplexer SP only selects the next packet to be transferred, once enough time has elapsed that t[$]≥VTS.

A problem in the system shown in FIG. 1 is that the packets representing the traffic flow V1 too are delayed. This can cause the transmission delays of the packets representing the traffic flow V1 to increase over the permitted limit values. This has resulted in the system shown in FIG. 2, in which the FIFO queue 2, which stores the packets representing the traffic flow V2, offers the packets to the multiplexer SP only once enough time has elapsed that t≥VTS, becoming established as the system generally used according to the prior art. The system shown in FIG. 2 does not delay the packets representing the traffic flow V1, and thus does not diminish the delay properties of the traffic flow V1. In other words, the quality of service required for the traffic flow V1 is maintained. The functioning of the system depends on the assumption that the speed properties of the traffic flow V1 arriving at the system are sufficiently within the desired limits. In that case, the speed properties of the aggregate flow A will be sufficiently within the desired limits, because the speed limits of the other sub-factor—the traffic flow V2—are monitored and limited. Naturally, one problem is the uncertainty concerning the speed properties of the traffic flow V1 and another problem is the fact that temporal variation in the speed properties of the traffic flow V1 appears directly as a temporal variation in the speed properties of the aggregate flow A, FIG. 3.

Defects of the prior art disclosed above may be eliminated by creating an entirely new type of method and equipment for performing flow shaping that retains the quality of service in packet-switched telecommunications. A novel method and equipment for performing shaping as described herein may avoid the aforementioned problems relating to the prior art.

One aspect described herein is directed to perform flow shaping that maintains service quality in a packet-switched telecommunication system. This aspect features transferring digital information as constant or variable-length packets, wherein the packets arrive in the system as at least two separate traffic flows, the packets arriving in the system are forwarded from the system along one or more transfer links, wherein as a result of the forwarding of packet representing a specific first traffic flow arriving in the system, at least one such variable is updated, which is also updated as a result of the forwarding of packets representing a specific second traffic flow arriving in the system, and a packet representing the first said traffic flow is forwarded independently of the said variable, and the earliest permitted moment of forwarding a packet representing the said second traffic flow is defined, at least partly, on the basis on the said variable.

The novel equipment described herein is, in turn, characterized by what is stated in the characterizing portion of claim 5.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Traditionally, flow-shaping machinery operates in such a way that, in connection with the traffic flows being monitored, the corresponding VTS values are updated, for example, as shown in equations 1, 2, and 3 and, if necessary, the forwarding of the packets relating to the traffic flows being monitored is delayed. The method according to the embodiments is characterized by the fact that, in connection with one or more specific traffic flows, the shaping machinery operates in such a way that it only updates the VTS values, but does not delay the packets representing the relevant traffic flows. The delaying performed on the basis of the relevant VTS values is applied to the forwarding of packets representing the other traffic flows.

Figure 1:
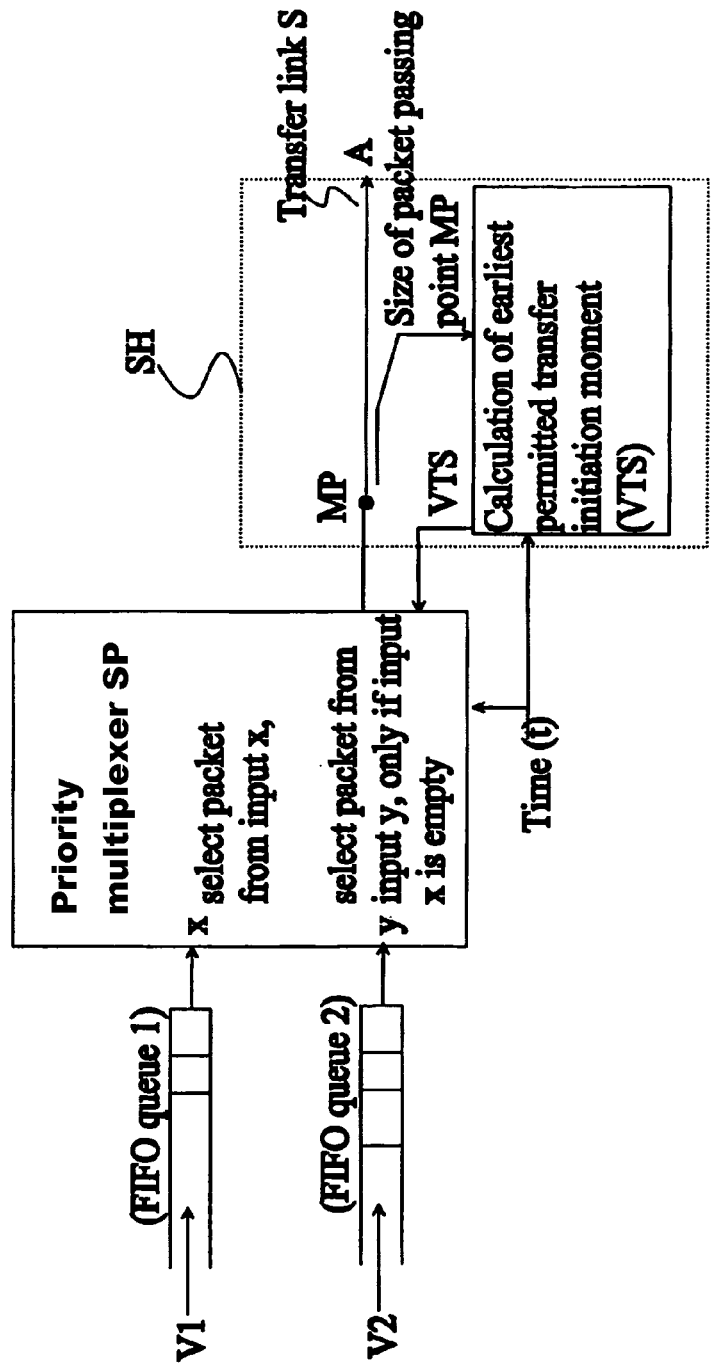
FIG. 1 shows a block diagram of one system according to the prior art, by means of which the speed properties of an aggregate flow A can be monitored and limited.
Figure 2:
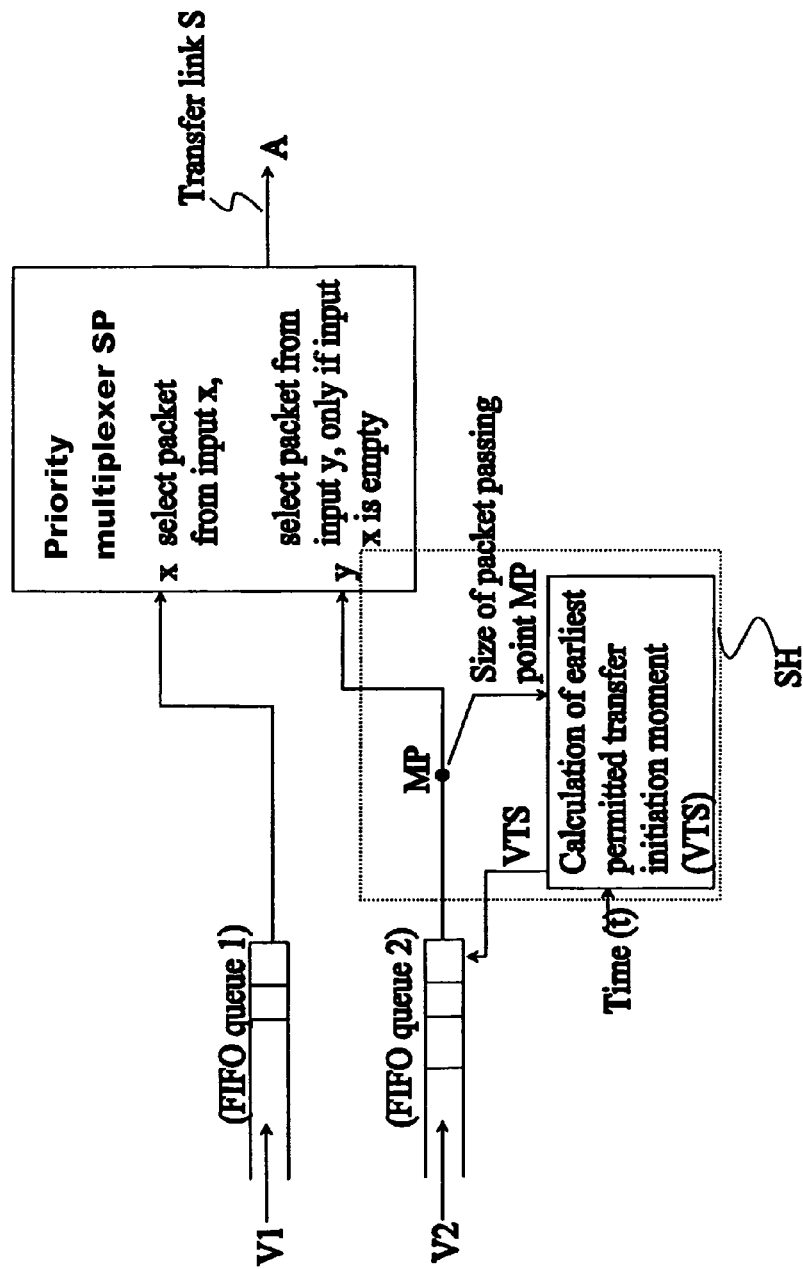
FIG. 2 shows a block diagram of a second system according to the prior art, by means of which the speed properties of an aggregate flow A can be monitored and limited.
Figure 3:
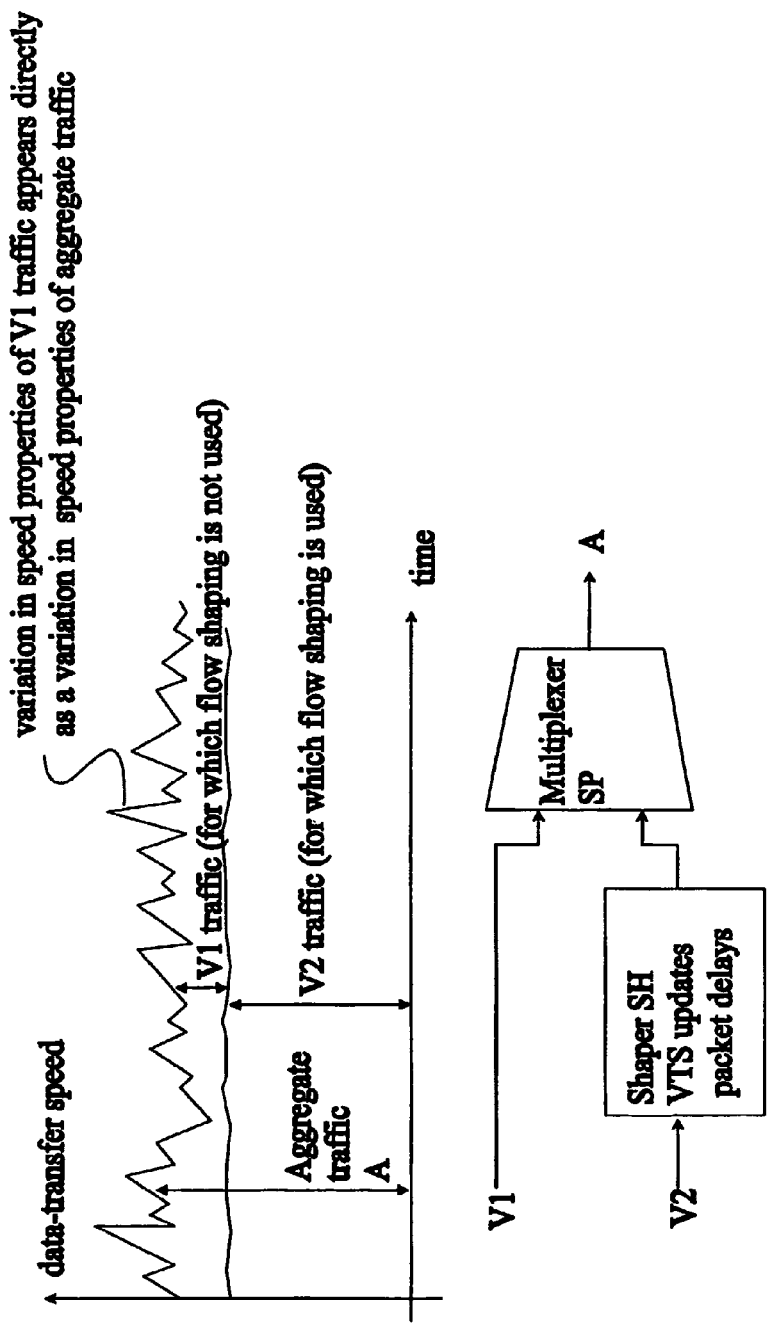
FIG. 3 shows the operation of the system according to FIG. 2.
Figure 4:
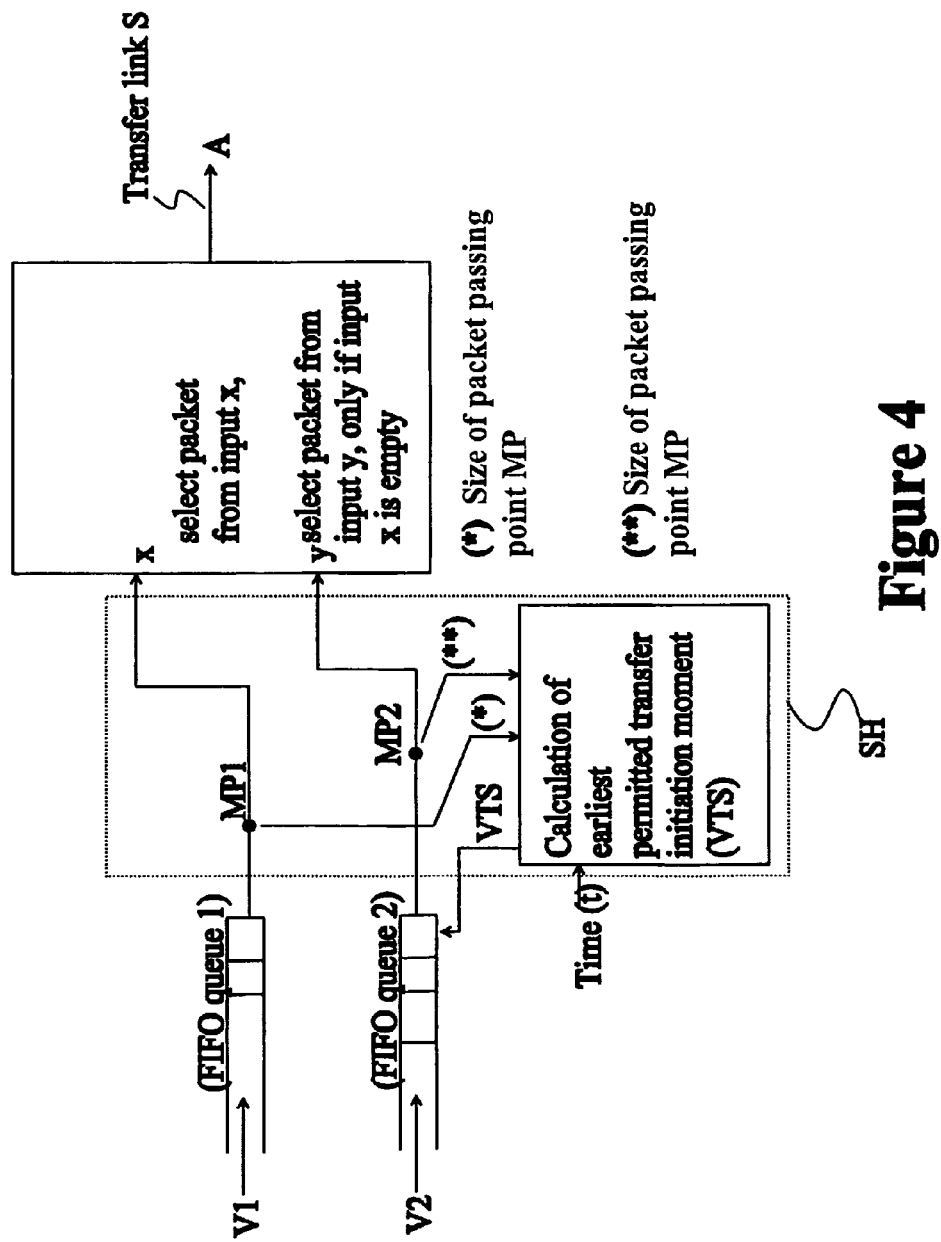
FIG. 4 shows a block diagram of one system according to the embodiments herein, by means of which the speed properties of an aggregate flow A can be monitored and limited.
Figure 5:
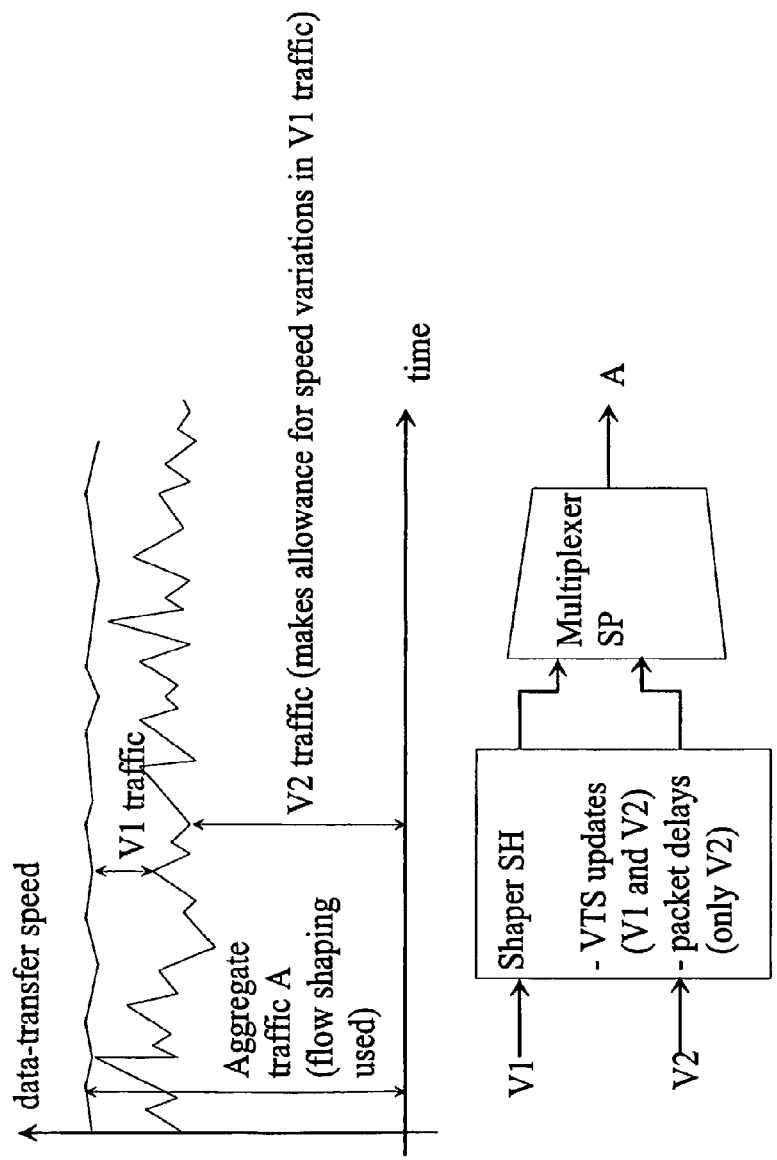
FIG. 5 shows the operation of a system according to embodiments hereing.

The operation of the method according to the embodiments will be examined with the aid of one system according to some embodiments, shown in FIG. 4. When a packet representing the traffic flow V1 is transferred past the measurement point MP1, the VTS values are updated in a manner according to equations 1, 2, and 3. Correspondingly, when transferring a packet representing the traffic flow V2 past the measurement point MP2, the said VTS values are updated in a manner according to equations 1, 2, and 3. No restrictions are set for the FIFO queue 1, which stores packets representing the traffic flow V1, as to when the FIFO queue 1 can offer packets to the input x of the multiplexer SP. The FIFO queue 2 storing packets representing the traffic flow V2, on the other hand, can only offer packets to the input y of the multiplexer SP, if the moment of time t being examined is at least as great as the VTS value (t VTS). This means that the transmission speed of the traffic flow V2 is effectively limited in a situation, in which the transmission speed of the traffic flow V1 is high, as the VTS value will increase rapidly purely due to the effect of the forwarding of packets representing the traffic flow V1. Correspondingly, in a situation, in which the transmission speed of the traffic flow V1 is low, the transmission speed of the traffic flow V2 will be limited considerably less, as the forwarding of packets representing the traffic flow V1 will have little effect in increasing the VTS values. Thus, the operation shown in FIG. 5 will be achieved, in which the transmission speed of the traffic flow V2 will adapt to variations in the transmission speed of the traffic flow V1. The speed properties of the aggregate flow A can thus be monitored and limited, without requiring packets representing the traffic flow V1 to be delayed.

The method described herein may also be used when some other multiplexer than one based on priority is used, for example, a weight-coefficient-based multiplexer (WFQ, Weighted Fair Queuing) [1].

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
by a network node, forwarding first packets of a first traffic flow and second packets of a second traffic flow, the first and second traffic flows being separate traffic flows, wherein forwarding the first and second packets includes:
forwarding at least one of the first packets earlier than an earliest permitted moment that the network node is allowed to forward a next packet; and
forwarding at least one of the second packets not earlier than the earliest permitted moment the network node is allowed to forward the next packet.

2. The method according to claim 1, wherein the earliest permitted moment allows the next packet to be forwarded without violating at least one transmission speed limitation related to flow shaping.

3. The method according to claim 1, wherein the first traffic flow is a delay-critical traffic flow and further wherein the second traffic flow is a non-delay-critical traffic flow.

4. The method according to claim 1, further comprising:
maintaining a quality of service required for the first traffic flow by adapting transmission speed of the second traffic flow based on variations in transmission speed of the first traffic flow.

5. The method according to claim 1, further comprising:
aggregating the first packets of the first traffic flow and the second packets of the second traffic flow onto a common path by multiplexing the first traffic flow and the second traffic flow based on priority (Strict Priority) or Weighted Fair Queuing.

6. The method according to claim 1, further comprising:
limiting speed properties of an aggregate flow including the first packets of the first traffic flow and the second packets of the second traffic flow without delaying the first packets of the first traffic flow; and
monitoring speed properties of the aggregate flow.

7. The method according to claim 1, further comprising:
storing the first packets of the first traffic flow in a first queue and storing the second packets of the second traffic flow in a second queue; and
offering packets from the first queue to a first input of a multiplexer without any restrictions and restricting offering packets from the second queue to a second input of the multiplexer based on a predetermined elapsed time.

8. A network node, comprising:
a classifier configured to classify a packet arriving at the network node as representing one of a first traffic flow and a second traffic flow, the first and second traffic flows being separate traffic flows;
a shaper configured to compute an earliest permitted moment when a next packet can be forwarded without violating transmission speed limitations related to flow shaping of an aggregate of the first and second traffic flows; and
a transfer unit configured to forward first packets of the first traffic flow and second packets of the second traffic flow, the transfer unit further configured to forward the first packets of the first traffic flow independent of the earliest permitted moment computed and the second packets of the second traffic flow not earlier than the earliest permitted moment computed.

9. The network node of claim 8 wherein the shaper is further configured to compute the earliest permitted moment on the basis of maximum permitted burst size and maximum permitted mean transmission speed related to the flow shaping of the aggregate of the first and second traffic flows.

10. The network node of claim 8 further including:
a first queue configured to store the first packets of the first traffic flow, and a second queue configured to store packets of the second traffic flow; and
a multiplexer configured to schedule packets offered from one of the first queue and the second queue, wherein packets offered from the second queue are only scheduled if packets are not offered from the first queue.

11. The network node of claim 10 wherein the first and second queues are First-In-First-Out (FIFO) queues.

12. The network node of claim 10 wherein packets from the first queue are offered to the multiplexer without any restrictions and packets from the second queue are offered to the multiplexer based on a predetermined elapsed time.

13. The network node according to claim 10, wherein the transfer unit is further configured to forward the first and second packets of the first and second traffic flows, respectively, along a plurality of transfer links.

14. A method, comprising:
forwarding packets representing an aggregate flow, the aggregate flow including a delay-critical first traffic flow and a non-delay critical second traffic flow, the first and second traffic flows being separate traffic flows;
controlling speed properties of the aggregate flow;
adapting transmission speed of the non-delay-critical second traffic flow to variations in transmission speed of the delay-critical first traffic flow; and
computing, as a result of forwarding of packets representing the aggregate flow, an earliest permitted moment a next packet representing the aggregate flow is allowed to be forwarded without violating transmission speed limitations related to flow shaping of the aggregate flow.

15. The method of claim 14, wherein forwarding delay-critical first traffic flow is not delayed by controlling the speed properties of the aggregate flow.

16. The method of claim 14, wherein the speed properties include at least one of the following: Committed Burst Size (CBS), Committed Information Rate (CIR), and Peak Information Rate (PIR).

17. The method of claim 14, wherein the next packet representing the delay-critical first traffic flow is allowed to be forwarded earlier than the earliest permitted moment computed.

18. The method of claim 14, wherein the next packet representing the non-delay-critical second traffic flow is not allowed to be forwarded earlier than the earliest permitted moment computed.

19. The method of claim 14, wherein packets carry digital information, the digital information being transferred as constant or variable-length packets.

20. A method, comprising:
forwarding packets representing an aggregate flow, the aggregate flow including a delay-critical first traffic flow and a non-delay critical second traffic flow, the first and second traffic flows being separate traffic flows;

controlling speed properties of the aggregate flow; and
adapting transmission speed of the non-delay-critical second traffic flow to variations in transmission speed of the delay-critical first traffic flow, the packets carrying digital information, the digital information being transferred as constant or variable-length packets.

\* \* \* \* \*